United States Patent [19]
MacIntyre et al.

[11] 3,792,615
[45] Feb. 19, 1974

[54] PRECISION POSITIONING MECHANISM, PARTICULARLY FOR POSITIONING TEST PROBES AND THE LIKE WITH RESPECT TO MICRO-ELECTRONIC UNITS

[75] Inventors: John S. MacIntyre, Lynnfield; Johnny T. Kirpatrick, Lowell, both of Mass.

[73] Assignee: Teledyne, Inc., Hawthorne, Calif.

[22] Filed: May 15, 1972

[21] Appl. No.: 253,333

[52] U.S. Cl. .................................. 74/44, 73/1 R
[51] Int. Cl. ............................................ F16h 21/22
[58] Field of Search 74/44, 61; 198/220 CA; 73/1 R

[56] References Cited
UNITED STATES PATENTS

| | | | |
|---|---|---|---|
| 1,924,516 | 8/1933 | Rider | 74/44 |
| 2,929,253 | 3/1960 | Baldelli | 74/44 |
| 3,097,738 | 7/1963 | Erickson | 198/220 CA |
| 3,277,697 | 10/1966 | Wittkunns | 74/44 |
| 3,299,722 | 1/1967 | Bodine, Jr. | 74/61 |
| 3,371,524 | 3/1968 | Wloszek | 73/1 R |
| 3,386,277 | 6/1968 | Hennings | 73/1 R |
| 3,434,331 | 3/1969 | Harper et al. | 73/1 R |

*Primary Examiner*—Charles J. Myhre
*Assistant Examiner*—Wesley S. Ratliff, Jr.
*Attorney, Agent, or Firm*—Morse, Altman, Oates & Bello

[57] ABSTRACT

A Z axis movement, for causing movement of an array of microelectronic units into and from contact with test probes or the like comprises a base plate, which can be levelled with the aid of an associated bubble level and a three point set of adjusting screws, and a vertically reciprocable support for the array, which is constrained by depending tongues that slide in guideways fixed with respect to the base plate and by an eccentric linkage that controls extreme positions of the support in response to precision actuation of a stepping motor.

6 Claims, 6 Drawing Figures

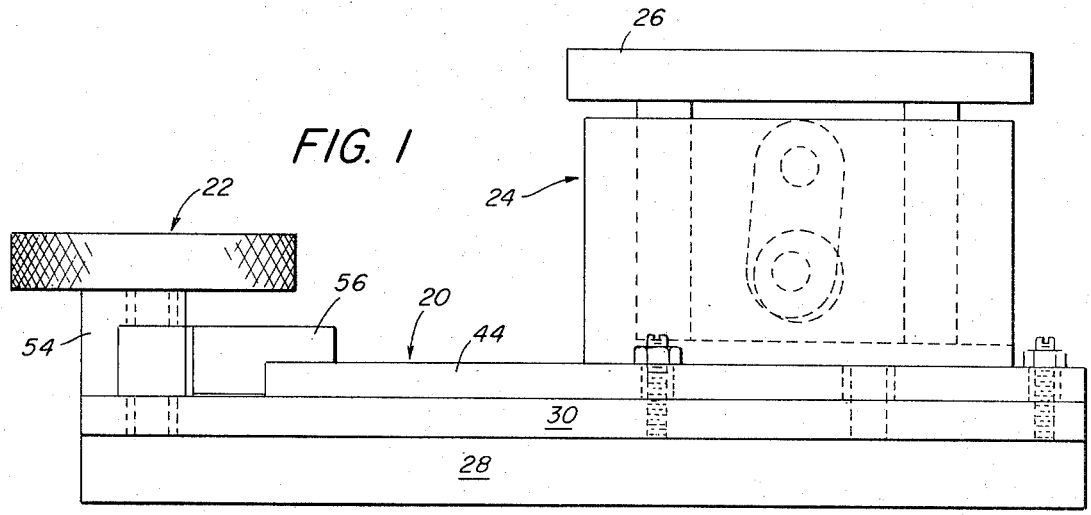
FIG. 1
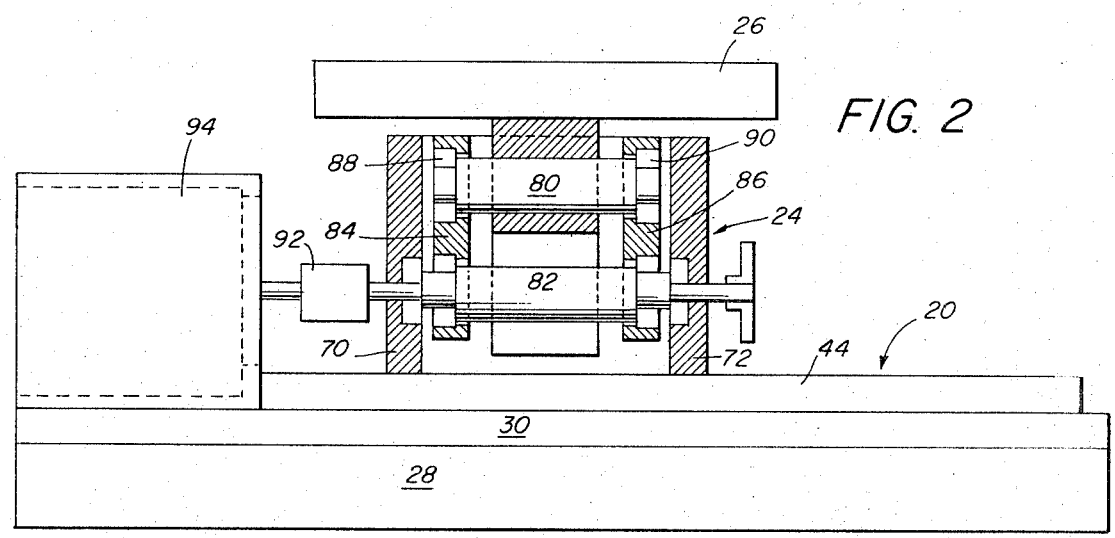
FIG. 2
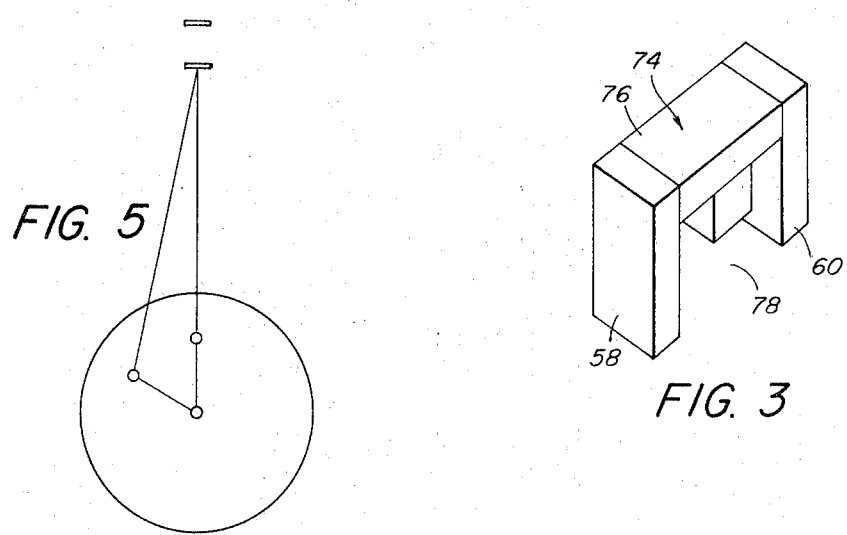
FIG. 5
FIG. 3

PATENTED FEB 19 1974 3,792,615
SHEET 2 OF 2
FIG. 6
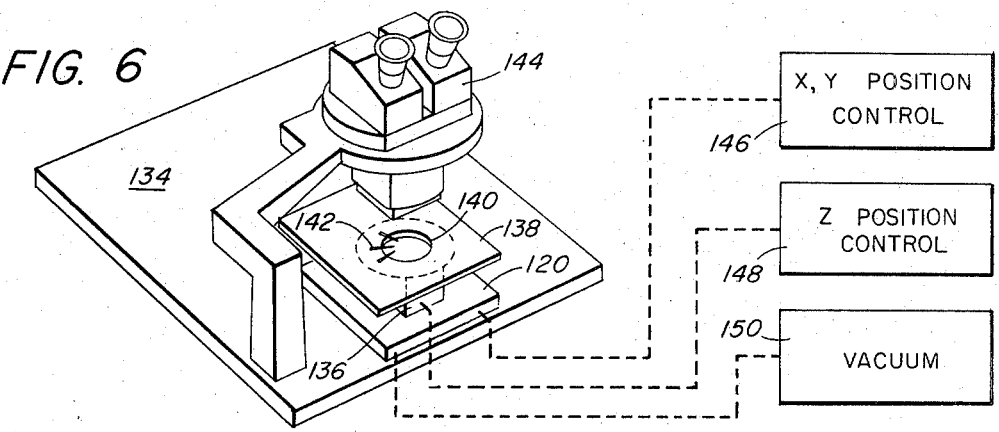
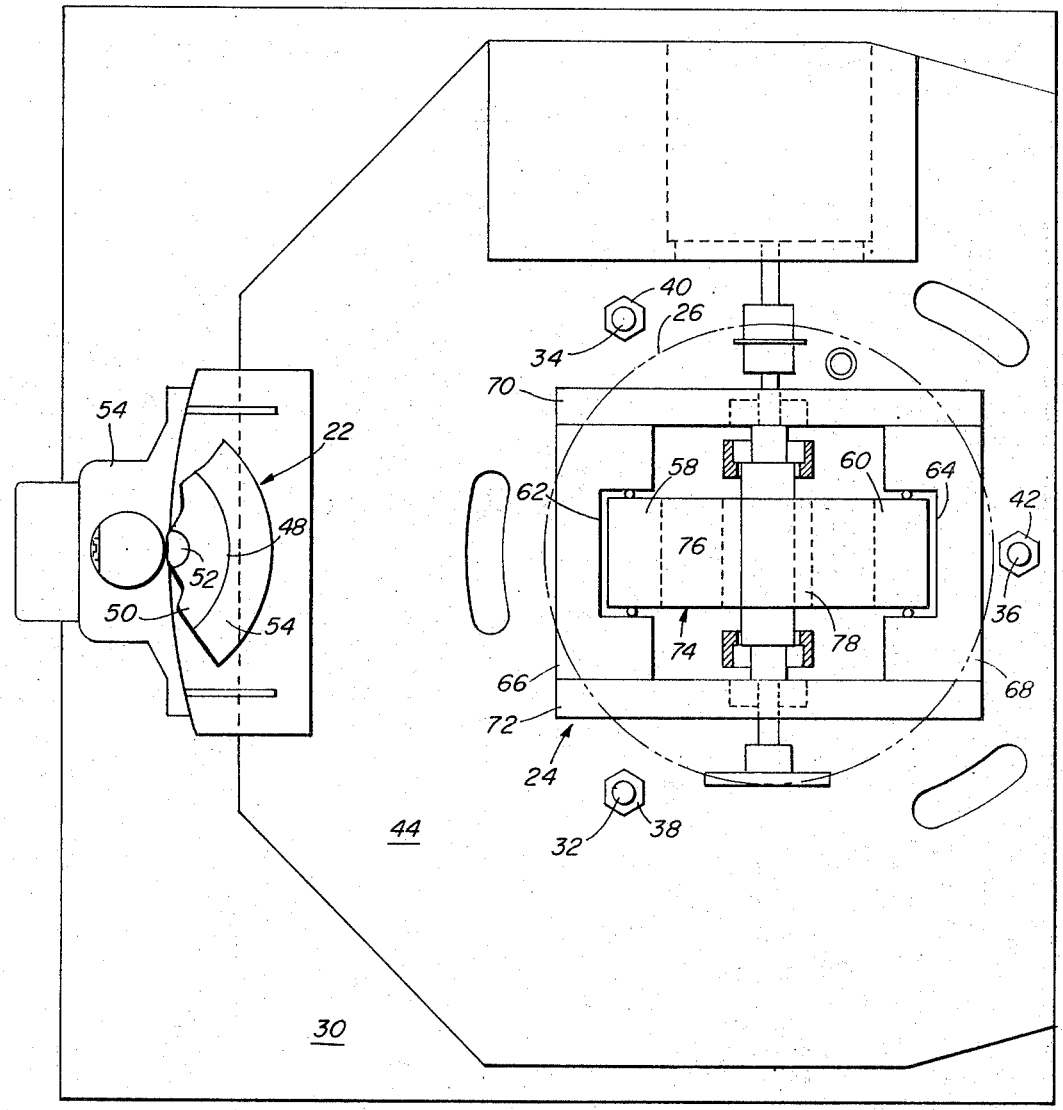
FIG. 4

PRECISION POSITIONING MECHANISM, PARTICULARLY FOR POSITIONING TEST PROBES AND THE LIKE WITH RESPECT TO MICRO-ELECTRONIC UNITS

BACKGROUND AND SUMMARY

The present invention relates to the testing of microelectronic units and, more particularly, to the testing of micro-electronic units typified by an array of solid state transistors, diodes or integrated circuits, which have been fabricated on a support wafer and which are to be tested and classified prior to their being isolated and sorted. In such a test device, the wafer typically is positioned on a support that is located with respect to one or more stationary electrical probes, markers and/or other sensors. The operational sequence involves first moving the support along the X and Y axes in order to register a selected micro-electronic unit with respect to the sensors and then moving the support along the Z axis in order to cause a selected micro-electronic unit to be contacted by the sensors. Successive selection of the micro-electronic units of the array is continued until each of the micro-electronic units on the wafer has been tested and classified.

Prior Z axis positioning mechanisms have been unduly bulky and expensive.

The primary object of the present invention is to provide a Z axis positioning device for use, for example, in an automatic test system for an array micro-electronic units, comprising a base plate, which can be levelled with the aid of an associated bubble level and a three point set of adjusting screws, and a vertically reciprocable support for the array, which is constrained by depending tongues that slide in guideways fixed with respect to the base plate and by an eccentric linkage that controls extreme positions of the support in response to precision actuation of a motor. This linkage produces a harmonic motion by which the initial and final positioning of the base plate is extremely gentle, whereby shock to the micro-electronic units, as they are contacted by a test probe, is minimized.

Other objects of the present invention will in part be obvious and will in part appear hereinafter.

The invention accordingly comprises the illustrated device, together with its components and their interrelationships, which are exemplified in the accompanying disclosure, the scope of which will be indicated in the appended claims.

BRIEF DESCRIPTION OF THE DRAWINGS

For a fuller understanding of the nature and objects of the present invention, reference is to be had to the following detailed description, taken in connection with the accompanying drawings, wherein:

FIG. 1 is a side elevation of the Z axis movement of the present invention;

FIG. 2 is an end elevation of the Z axis movement of FIG. 1;

FIG. 3 is a perspective view of a component of the device of FIGS. 1 and 2;

FIG. 4 is a top plan view of the Z axis movement of FIG. 1;

FIG. 5 is a diagram illustrating certain principles of the present invention; and FIG. 6 is a schematic view, partly in mechanical perspective and partly in block diagram, of an X, Y, Z micropositioning system embodying the present invention.

DETAILED DESCRIPTION

Generally, the illustrated Z axis mechanism comprises a base assembly 20 which defines a reference plane, a universal level assembly 22 by which the reference plane is precisely oriented, and a Z stage mechanism 24, by which a vacuum chuck 26 is raised and lowered between precise upper and lower positions along an axis that is precisely vertical with respect to the reference plane.

As shown, base assembly comprises a base plate 28 that is secured within an apparatus requiring a precision Z stage mechanism, for example, within apparatus of the type shown in FIG. 6. A reference plate 30 is oriented with respect to base plate 28 by three screws 32, 34, 36 which are positioned at the apices of an equilateral triangle and which are turned into internally threaded bores in reference plate 30 so as to abut against base plate 28, the orientation of reference plate 30 thereby being adjustable with respect to base plate 28. The distance by which screws 32, 34, 36 protrude from their internally threaded bores is determined by adjustment. Screws 32, 34, 36, which protrude through unthreaded bores in mounting plate 44, are locked in position by nuts 38, 40, 42, which are tightened against the upper face of mounting plate 44.

Horizontal orientation of reference plate 30 is achieved with the aid of a universal level in the form of a disc shaped jacket 46, the upper slightly domed face of which presents concentrically graduated indicia 48 and within which is a fluid 50 and an air bubble 52. Jacket 46 is secured to a bracket 54 which precisely positions the jacket in a plane that is parallel to the plane of reference plate 30. Bracket 54 is precisely positioned with respect to mounting plate 44 by an auxiliary bracket 56.

Vacuum chuck 26 is carried at the upper edges of a pair of slides 58, 60, which ride on ball bearings within the vertical channels 62, 64 of the pair of upstanding posts 66, 68, the bases of which are fixed to mounting bracket 44. Posts 66, 68 are connected by side plates 70, 72, which also are fixed at their lower edges to mounting plate 44. Connecting vertical slides 58, 60 is a center piece 74, having a cross piece 76, the opposite ends of which are fixed to slides 58,60 and a vertical piece 78, which depends in parallel between slides 58, 60. The central portion of shaft 80 is journaled in a bore through center piece 78 and the center portion of shaft 82 is free. A pair of links 84, 86 journal the extremities of shafts 80, 82 as follows. Shaft 80 is axially journaled at its opposite ends, which are of reduced diameter and which extend into a pair of bushings 88, 90 at the upper extremities of links 84, 86. The outer extremities of shaft 82 are provided with intermediate shouldered extensions having axes that are spaced from the axis of shaft 82 so as to be eccentric and are journaled in bushings mounted in links 84,86. Extending from the intermediate shouldered extensions of shaft 82 are outer shouldered extensions which are disposed along the axis of shaft 82 and are journalled in bushings in side plates 70,72. One of these outer shouldered extensions is connected via a coupling 92 to a stepping motor 94. It will be apparent that rotation of shaft 82, because of the eccentricity of the intermediate shouldered extensions causes pivotal motion of linkage 84, which by virture of the constraint applied to slides 58, 60, causes vertical motion of the slides and of vacuum chuck 26. In alternative embodiments, stepping motor 94 is replaced by a hydraulic or an electrical servo motor.

An apparatus for testing micro-electronic units of an array is shown in FIG. 6 as comprising a plate 120, which is supported for movement on a base 134. Supported on base 134 is a plate 120 that is constrained for movement along X and Y axes on an X,Y movement. Supported on plate 120 is a Z axis movement 136. Z axis movement being designed to carry a vacuum chuck capable of supporting the wafer. Fixed mounted above the Z axis movement 136 is a centrally opened probe support plate 138 having a central opening 140, which generally is positioned above vacuum chuck 136 and which carries a plurality of probes 142 that project from the portion of plate 138 surrounding the opening to positions overlying the opening. It will be apparent that when plate 120 is positioned as desired along X and Y axes and vacuum chuck 136 is moved along the Z axis upwardly, then probes 142 are capable of contacting the micro-electronic units on the wafer. Mounted above opening 140 is a stereo microscope 144 by which the wafer may be observed during any testing process. As shown, the position of the plate 120 along X and Y axes is determined by an electro-mechanical control 146. The Z axis operation of vacuum chuck 136 is controlled by an electro-mechanical control 148. And vacuum chuck 136 is provided with a vacuum by a suitable pump 150.

OPERATION AND CONCLUSION

Prior to testing, screws 32, 34, 36 are adjusted until bubble level 22 indicates the horizontal. Then, in operation, a wafer, upon which an array of micro-electronic units has been fabricated, is positioned on vacuum chuck 136. While under observation through microscope 144, plate 120 is positioned along X and Y axes until test probes 142 are in registration with appropriate portions of a selected one of the micro-electronic units. Next vacuum chuck 136 is actuated in order to cause movement of the wafer and the selected micro-electronic unit along the Z axis into contact with probes 142. Next this process is continued sequentially until all of the micro-electronic units on the wafer are so tested.

The present invention thus provides a precision Z movement, that is characterized by unusual compactness and responsiveness. Since certain changes may be made in the foregoing disclosure without departing from the scope of the present invention, it is intended that all matter described in the foregoing specification or shown in the accompanying drawings be interpreted in an illustrative and not in a limiting sense.

What is claimed is:

1. A Z-axis movement comprising a base plate for affixation within a test instrument, a reference plate, vertical constraint means mounting said reference plate, an eccentric means journalled on said base plate for rotation between a first limit and a second limit, an electrically energized drive means on said reference plate for actuation of said eccentric means, linkage means connected between said eccentric means and said reference plate, whereby actuation of said eccentric means causes a harmonic motion of said reference plate, said harmonic motion being characterized, for a given rotational speed of said eccentric by relatively slow motion of said vertical slide means when said eccentric is close to either said first limit or said second limit and relatively rapid motion of said vertical slide means when said eccentric is midway said first limit and said second limit, and leveling means on said base means for said reference plate.

2. A Z axis movement comprising a base plate for affixation within a test instrument, a reference plate, vertical constraint means mounting said reference plate, an eccentric means journalled on said base plate for rotation between a first limit and a second limit, an electric motor on said reference plate for actuation of said eccentric means, linkage means connected between said eccentric means and said reference plate, whereby actuation of said eccentric means causes a harmonic motion of said reference plate, said harmonic motion being characterized, for a given rotational speed of said eccentric, by relatively slow motion of said vertical slide means when said eccentric is close to either said first limit or said second limit and relatively rapid motion of said vertical slide means when said eccentric is midway said first limit and said second limit and a bubble level affixed to said base plate for leveling said base plate and said reference plate in parallelism to a horizontal plane.

3. A Z axis movement comprising a base plate for affixation within a test instrument, a reference plate having three contact means connected thereto and abutting against said base plate, said three contact means being adjustable in order to orient said reference plate with respect to said base plate, means on said reference plate for indicating the departure from horizontal of said reference plate, upstanding mounting means affixed to said reference plate, a first shaft journalled at opposite ends in said mounting means for rotation about a first axis a motor coupled to said first shaft for limited rotation, a slide having portions constrained for movement along a Z axis within ways defined in said mounting means, a support carried by said slide, a pair of links, a second shaft having a pair extremities respectively journalled in said pair of links and a medial portion journalled in said slide, said first shaft having a medial portion that is developed about a second axis eccentric to said first axis, said medial portion being journalled for rotation in said links.

4. The Z axis movement of claim 3 wherein said level means is a bubble level.

5. The Z axis movement of claim 3 wherein said motor is a stepping motor.

6. The Z axis movement of claim 3 wherein said ways include ball bearings.

* * * * *